May 29, 1962

C. L. MILLER 3,036,583

PORTABLE COVER FOR SMALL AUTOMOBILES

Filed June 13, 1960

INVENTOR.
Chester L. Miller
BY Scott L. Norvell
atty.

United States Patent Office 3,036,583
Patented May 29, 1962

3,036,583
PORTABLE COVER FOR SMALL AUTOMOBILES
Chester L. Miller, 8245 N. 27th Ave., C–99,
Phoenix 21, Ariz.
Filed June 13, 1960, Ser. No. 35,478
4 Claims. (Cl. 135—4)

This invention concerns a portable cover for small automobiles or the like.

It is intended that this cover take the place of a garage, shelter or other temporary covering device which will protect the car, automobile, or the like, from sun, rain and wind.

One of the objects of the device is to provide a shelter having a base and a foldable or collapsible awning that extends over the base when the car is in place on the base and which may be attached to the front and rear portion of the car to gain stability and support.

Another object of the invention is to provide such a temporary or portable shelter, as above stated, which may be folded flat, and, when folded, will lie close to the ground and may be left on a driveway or moved to one side of the driveway, as desired.

Still another object is to provide a light portable shelter for an automobile which is self-contained and may be easily attached to the automobile for the purpose of anchoring it.

Other objects will appear hereinafter.

I attain the foregoing objects by means of the devices, combinations of devices and structure shown in the accompanying drawings, in which.

Similar numerals refer to similar parts in the several views.

Figure 1:
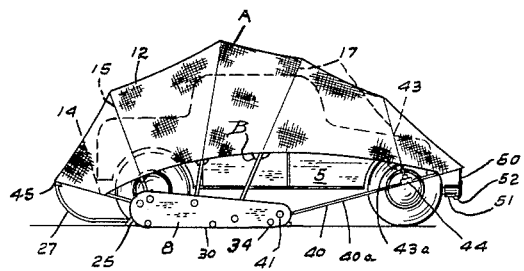
FIGURE 1 is a side elevational view of my automobile cover.

The cover consists generally of a base 2 which has two runways 3 and 4 for the front wheels of the automobile 5 to be covered. These are left and right duplicates. Laterally beyond each of the runways there are bow holders 7 and 8. These holders hold the top bows, generally indicated by numeral 10. Over these bows there is a canvas cover 12, which is cut to fit over the forward bows, such as 14 and 15 and extend rearwardly to cover the back bows, generally indicated as 17, and the back portion of the automobile.

The runways 3 and 4 are held together by transverse tubes 20, 21 and 22. These are bolted to the under side of the runway planks by bolts 23, or otherwise adequately secured to these planks. Each of the runway planks has a stop block 25 at the forward end. These blocks are secured by bolts extending through the planks and may be adjusted lengthwise of the plank when desired by placing the bolts in optional holes 26, when necessary.

To stiffen the assembly of the transverse pipes I add the stem pipe 27. This is secured by welding or clamps and is used to form a base for anchoring the front bow 14.

The bow holders 7 and 8 are left and right counter parts and each consists of an outside plate 30 and an inside plate 31. These plates are preferably made of light metal such as aluminum and are kept apart by spacer blocks or pipes 33 and are held together by bolts 34. All bows are U-shaped and have straight side portions such as 35 and 35' joined by arched bent portions 36. The straight portions 35 and 35' extend into the face between the outer and inner plates 30 and 31, respectively, of the holders 7 and 8. Through bolts such as 38, 39 and 41 extend through the plates 30 and 31 and the respective ends of the side portions of the bows.

The back bow 40 has the largest span and has its straight side portions 40a held by bolts or rivets 41. It is to be noted that the back bow extends beyond the rear portion of the car to be covered and is dimensioned so as to extend approximately over the rear bumper of the car 5. A short bow 43 has its side members 43a attached to the side members 40a of the rear bow 40. This attachment is made to a T fitting 44 on the side members 40a of the rear bow 40. The side members of bow 43 are attached by pins so as to provide a pin joint at this point.

Figure 3:
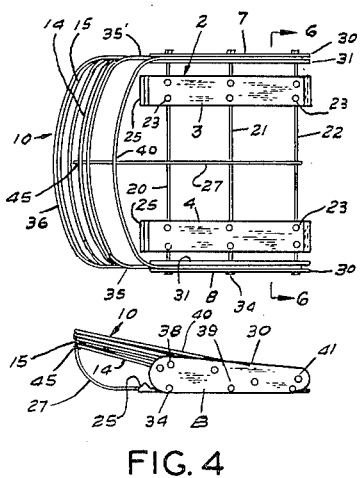
FIGURE 3 is a plan view of the cover base and frame but with the fabric removed.
Figure 5:
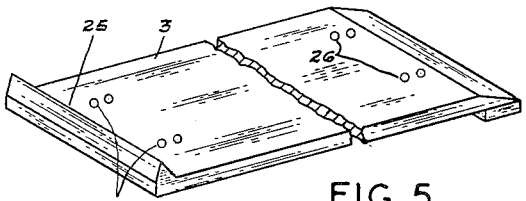
FIGURE 5 is a perspective view of one of the wheel runways, drawn on an enlarged scale.
Figure 4:
FIGURE 4 is a side elevational view of the cover with the fabric removed and in folded condition.
Figure 6:
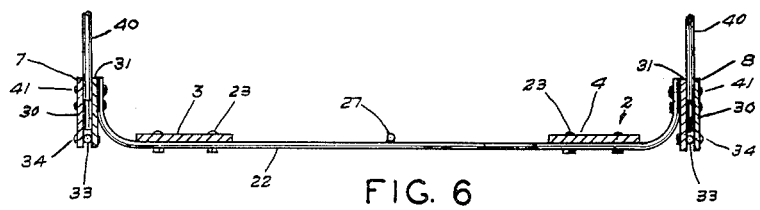
FIGURE 6 is a sectional view taken on line 6—6 of FIGURE 3 and showing the structure of the base and attendant parts.
Figure 7:
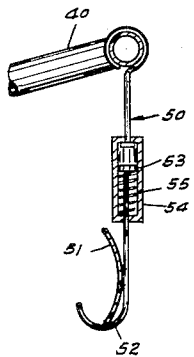
FIGURE 7 is a partial section of one of the top cover hold down clamp hooks, drawn on an enlarged scale.

The central stem 27 is bent upward at the front to form a prow attachment 45. This upwardly extending prow portion is attached to the center of the front bow 14 and tends to hold it downward at all times. When the bows are folded forward they assume the substantially vertically stacked positions shown in FIGURES 3 and 4. Whereas, in this figure the bows only are shown, in order to make the view clearer, it is to be understood that when the canvas cover A is applied the bows assume the positions shown in FIGURES 3 and 4 and the canvas folds between them.

The canvas cover A conforms to both the transverse and longitudinal curvatures of the bows as they extend over the base. The cover may be secured to the bows in tubular pockets B which are sewed onto the inner face of the cover A as seen in FIG. 1.

Figure 2:
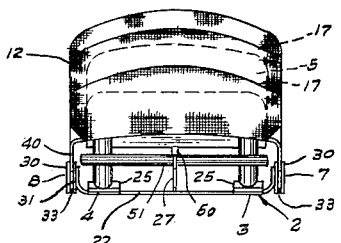
FIGURE 2 is a rear elevational view thereof.

When the device is to be used the automobile 5 is driven so that the front wheels run up onto the planks of the runways 3 and 4 until the stops 25 are reached. The operator of the car then gets out and grasps the side of the rear bow 40 and pulls it upward and rearwardly over the entire car, as shown in FIGURES 1 and 2. Since the front bow 14 is anchored to the stem the entire cover A unfolds rearwardly and covers the entire car. The rear bow 40 is then anchored by the hooks 50 which easily engage under the rear bumper 51 of the car. Note that the actual hooks 52 are somewhat large and that they have a piston like stop 53 at the top. This runs in a cylinder 54 and is resiliently urged upward by spring 55. When the hook portion 52 engages the car bumper 51 the rear bow 40 is held downward under the tension of the springs 55 and the entire top cover A is kept under a desired tension with the canvas held tightly in a water and wind proof manner.

I claim:

1. In an automobile portable shelter, a frame and support for a cover composed of a base having a forward end and a rear end, parallel spaced planks constituting runways for the front wheels of the automobile to be covered, and adapted to rest on the ground, transverse base frame members joining said planks, a central longitudinal stem attached to the central portion of each of said transverse frame members having its forward end curved upward to form a prow, parallel longitudinal bow holders having vertical slots attached at the ends of said transverse base frame members, and a plurality of U shaped transversely extending bows, having straight side portions joined centrally by arched top portions; the ends of the straight portions extending into the slots and being pivotally attached to said bow holders; said pivotal points of attachment of said bows being disposed along the length of each of said bow holders; the forward bow extending forward beyond the forward end of said base and being attached to said prow centrally to prevent rearward pivotal movement; said rear bow extending substantially horizontally rearwardly and having its curved portion extending rearward of the rear of the car to be covered.

2. The device as described in claim 1 wherein the bow adjacent to the back bow has its straight side portions pivotally supported on the back bow; said point of pivot being substantially in the rearward portion of said back bow.

3. In the shelter cover described in claim 1 wherein the bow holders have pivot pins pivotally securing the lower ends of the side portions of the bows in the slots of the respective bow holders, said pivot pins being spaced and disposed along the length of said bow holders so that each bow pivots through a separate arc, and so that when the bows are pivoted to the forward folded position the curved portions will be disposed in a substantially vertical stack.

4. In the shelter support, as described in claim 1, hooks attached to the rear bow and having spring intermediate portions so as to resiliently hold the bow downward and the top cover attached to the bow taut.

References Cited in the file of this patent

UNITED STATES PATENTS

| | | |
|---|---|---|
| 2,598,940 | Robie | June 3, 1952 |
| 2,798,501 | Oliver | July 9, 1957 |